Figure 1:
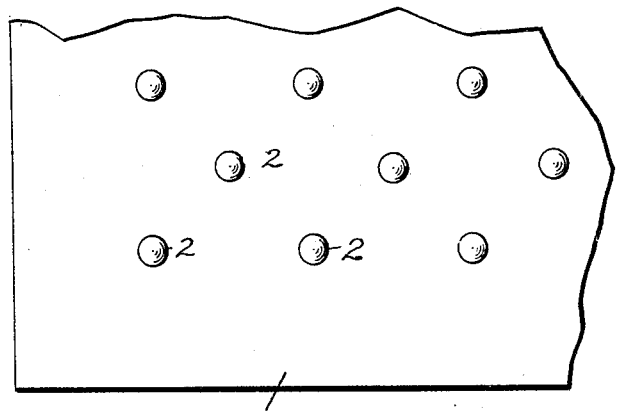

Sept. 16, 1930.  A. E. BRONSON  1,776,017
METHOD OF AND APPARATUS FOR APPLYING RUBBER
WASHERS TO VALVES OR THE LIKE
Filed Dec. 7, 1923

Inventor
Adelbert E. Bronson
By Thurston Kwis & Hudson
Attorney

Patented Sept. 16, 1930

1,776,017

UNITED STATES PATENT OFFICE

ADELBERT E. BRONSON, OF CLEVELAND, OHIO, ASSIGNOR TO THE DILL MANUFACTURING COMPANY, OF CLEVELAND, OHIO, A CORPORATION OF OHIO

METHOD OF AND APPARATUS FOR APPLYING RUBBER WASHERS TO VALVES OR THE LIKE

Application filed December 7, 1923. Serial No. 679,141.

This invention relates to a method of and apparatus for forming an external rubber washer upon a valve member. More particularly the invention relates to valve insides adapted to be detachably mounted within the valve stem of a pneumatic tire and provided with an external rubber washer.

The valve insides commonly employed in the valve stems of pneumatic tires consists of a small tubular member which has a threaded plug portion at its outer end which is adapted to be screwed into an internally threaded valve stem, the tubular member inwardly of the plug having an external conical rubber washer which is forced inwardly against an interior conical seat in the valve stem, and a valve which is adapted to seat against the inner end of the tubular member, the valve having a stem in the form of a rod which extends through the tubular member, the valve being held against its seat by means of a coiled spring surrounding the rod within the tubular member.

By reason of the extremely small size of the valve insides, the rubber packing member or washer upon the outside thereof is necessarily very small and as heretofore made is easily distorted. It is therefore very desirable that the rubber packing member or washer be very firmly affixed to the valve insides, otherwise the washer is liable to become distorted resulting in a leaky valve. Unless the washer adheres very firmly to the tubular member it is liable to strip off and remain, when the valve insides is removed, on the valve stem seat.

In methods heretofore employed it has been necessary to slip the rubber washers over the tubular members to the washer seats and the washers have had to be made with sufficient elasticity to permit them to stretch over the confining ribs at the end of the seat.

It is an object of the present invention to mold the washers in the form of raw rubber directly on the valve insides and to vulcanize washers so mounted while held under pressure against the entire circumference of the seat so that the rubber firmly adheres to the valve insides throughout the circumference thereof. By molding and vulcanizing the washers directly upon the valve insides, the rubber of the washers is better adapted to retain its shape under pressure.

A further object is to provide a method in which a large number of washers may be simultaneously moulded and vulcanized upon the valve insides.

A further object is to provide a method for molding and vulcanizing the washers directly upon the valve insides.

A further object is to make a more durable and effective washer for valve insides.

With the above and other objects in view, the invention may be said to comprise the method, apparatus and article produced thereby as illustrated in the accompanying drawings hereinafter described and particularly defined in the appended claims, together with such variations and modifications thereof as will be apparent to those skilled in the art to which the invention appertains.

Figure 2:
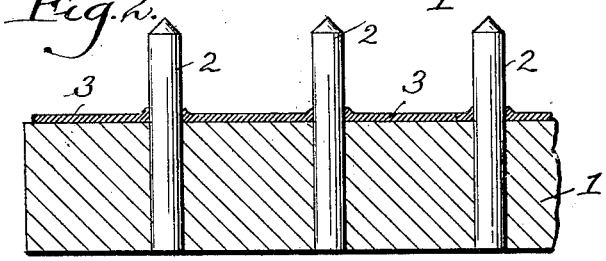
Figure 3:
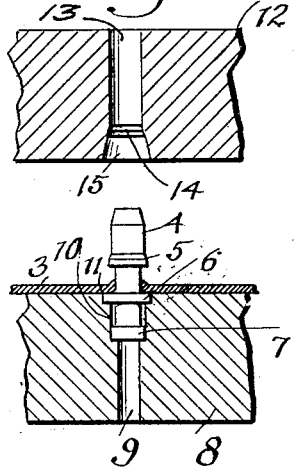
Figure 4:
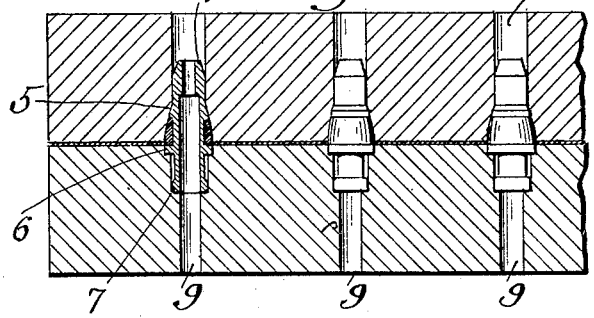
Figure 5:
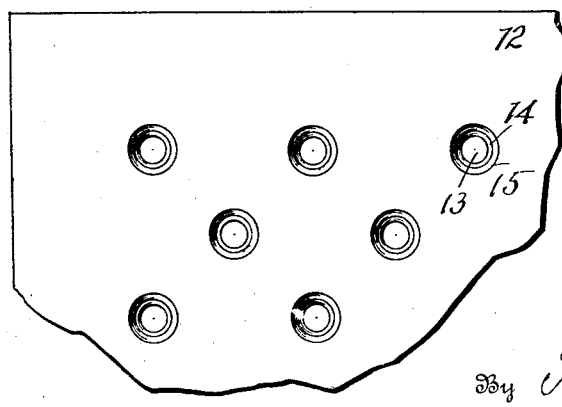

Reference should be had to the accompanying drawings forming a part of this specification in which Figs. 1 and 2 are plan and sectional views, respectively, of the device for perforating a sheet of raw rubber; Figs. 3 and 4 are sectional views showing the mold employed for forming and vulcanizing the washers on the valve insides, Fig. 3 showing the sections separated with the valve insides and sheet of raw rubber in place on the lower section, and Fig. 4 showing the sections clamped together with the washers molded and ready for vulcanizing. Fig. 5 is a bottom view of the upper die.

In accordance with the present invention, the washers are formed directly upon the valve insides from a sheet of raw rubber, the sheet being first perforated at regularly spaced points and placed upon a mold section which supports a series of barrels of valve insides in position such that they will register with the perforations in the sheet of raw rubber so that the sheet may be slipped over the barrels of the valve insides into engagement with the flat upper face of the mold section. The complementary mold section is formed with openings aligned with the valve insides supported by the lower section and is adapted to be clamped upon the first section with the flat lower face thereof in engagement with the rubber sheet, the lower portion of the opening in the upper section being formed to provide a washer molding chamber so that when the mold is closed and pressure is applied to the raw rubber sheet, the rubber will be forced into the molding chamber, filling the same. The mold is then placed in a vulcanizing press and the rubber is vulcanized while under pressure between the mold sections causing the washers formed by clamping the mold sections together to be vulcanized directly upon their seats so that the rubber adheres firmly to the barrel of the valve insides throughout the circumference thereof.

Referring to the accompanying drawings, the rubber sheet perforating device consists of a suitable flat plate 1 which has a series of regularly spaced pins 2 projecting from the upper face thereof. The sheet of raw rubber is laid upon the top of the pins 2 and is forced down by suitable means upon the surface of the plate 1 causing the sheet to be perforated and slightly thickened around each of the perforations.

The barrel of the valve insides, is in the form of a tubular member 4 which has inner and outer washer retaining ribs 5 and 6, the inner rib 5 being tapered on its inner side and the outer rib 6 being of slightly greater diameter than the rib 5, the ribs 5 and 6 forming between them a washer retaining channel. At its outer end the tubular member 4 has a slightly enlarged portion 7 of less diameter than the rib 6 upon which the threaded plug is adapted to be swiveled.

The lower section 8 of the mold is in the form of a flat plate which has a series of bores 9 therethrough which are positioned in exactly the same manner as the pins 2 of the perforating device. At its upper end each bore 9 has a counterbore 10 of a diameter to receive the enlarged outer end 7 of the tubular member 4, and a second counterbore 11 is of a diameter to receive the outer washer retaining rib 6 and of a depth to support said rib with its inner face flush with the top face of the section 8. The lower section 8 is adapted to support the tubular members 4 in positions thereof corresponding to the positions of the pins 2 of the perforating device so that the raw rubber sheet 3 may be placed with the perforations in alignment with the upper ends of the tubular members and forced down flat against an upper face of the mold section 8 as shown in Fig. 3.

The upper mold section 12 is in the form of a flat plate provided with bores 13 adapted to align with the bores 9 of the lower section, the diameter of the bore 13 being such that the upper end of the tubular member 4 will fit therein, the lower end of the bore 13 being enlarged and provided with a tapered seat 14 adapted to engage the tapered inner side of the washer retaining rib 5, and below the tapered seat 14 being flared outwardly to provide a washer molding chamber surrounding the washer seat when the sections are clamped together. When the sections are brought together and subjected to pressure, the upper section 12 is moved down until the tapered seat 14 engages the tapered side of the rib 5, the flat lower face of the section 12 being almost in contact with the upper face of the lower section 8. During the movement of the section 12 toward the section 8, the sheet 3 of raw rubber is compressed between the opposed faces of the two sections and is caused to flow into the space between the ribs 5 and 6 and the flared cavity 15 of the upper mold section, the rubber being thus molded into the form of a washer between the ribs 5 and 6 and the flared cavity 15 surrounding the tubular member 4. The mold with the raw rubber molded into the form of washers surrounding the valve members and held under pressure against the valve member are then placed in a suitable vulcanizer, and vulcanized. As shown in Fig. 4 the rubber sheet is pressed out very thin so that when the valve members are removed from the molds after the vulcanizing operation, the valve members with the washers thereon can be readily broken away from the sheet. In practice the valve members with the washers thereon are dumped from the molds into a tumbling drum and then screened entirely free from the thin sheet of rubber connecting the washers in the mold.

Having described my invention, I claim:

1. The process of forming a rubber washer upon a valve member which comprises applying a body of raw rubber circumferentially of a valve member, enclosing the valve member and confining said body of rubber between pressure mold members formed to provide an annular washer forming chamber around the valve member, applying pressure to said pressure member to cause the raw rubber to flow into and fill said annular chamber, and vulcanizing said raw rubber while held under pressure between the mold members.

2. The process of forming a rubber washer on a valve member having an external seat which comprises perforating a sheet of raw rubber, inserting the valve member into the perforation, confining said sheet between pressure applying mold members which have portions enclosing the valve member and portions engaging the sheet, applying pressure to said sheet to cause the rubber to flow into and fill the valve seat, and vulcanizing the rubber while held under pressure between the mold members.

3. The process of forming rubber washers upon a valve member which comprises forming a series of perforations in a sheet of raw rubber, inserting a series of valve members in said perforations, confining the valve members and sheet between mold members having portions formed to enclose the valve members on opposite sides of the sheet and to provide washer molding cavities surrounding the valve members, and other pressure applying portions adapted to engage opposite faces of the sheet intermediate the valve members, applying pressure to said mold members to cause the raw rubber to flow into and fill the washer forming cavities, and vulcanizing the washers on the valve members while held under pressure in the mold.

4. A mold for use in forming and vulcanizing washers upon valve members comprising sections provided with socket portions upon their inner faces adapted to receive the ends of a valve member and providing an annular space surrounding a portion of the valve member, said sections having inner faces intermediate the socket portions adapted when pressure is exerted on the sections to compress a body of raw rubber and cause the same to flow into and fill annular space around the valve member.

5. A mold for use in forming and vulcanizing rubber washers upon tubular valve members provided with an external washer receiving channel, comprising a pair of plates each having a series of holes therethrough, one plate aligning with those of the other, the inner ends of the holes in the two plates being formed to receive opposite ends of valve members, and having shoulders to engage shoulders on the valve members, one of the plates being adapted to support the valve members with the lower edges of the washer channels flush with the top surface thereof, the other of the plates having the inner ends of its openings flared to provide a washer forming chamber around the washer channel on the valve member, the valve member receiving portions of the plates permitting the plates to be moved almost into contact.

In testimony whereof, I hereunto affix my signature.

ADELBERT E. BRONSON.